B. SEABOLDT AND H. C. BROWN.
POWER ACTUATED PNEUMATIC TOOL.
APPLICATION FILED AUG. 2, 1919.
1,402,727. Patented Jan. 3, 1922.
2 SHEETS—SHEET 2.
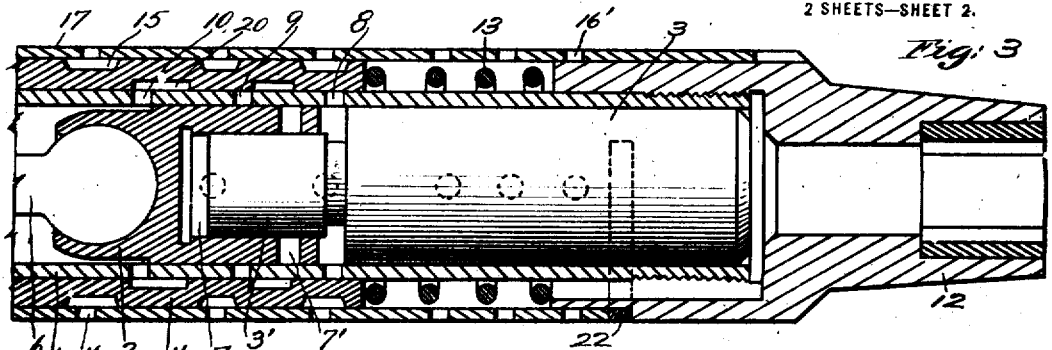
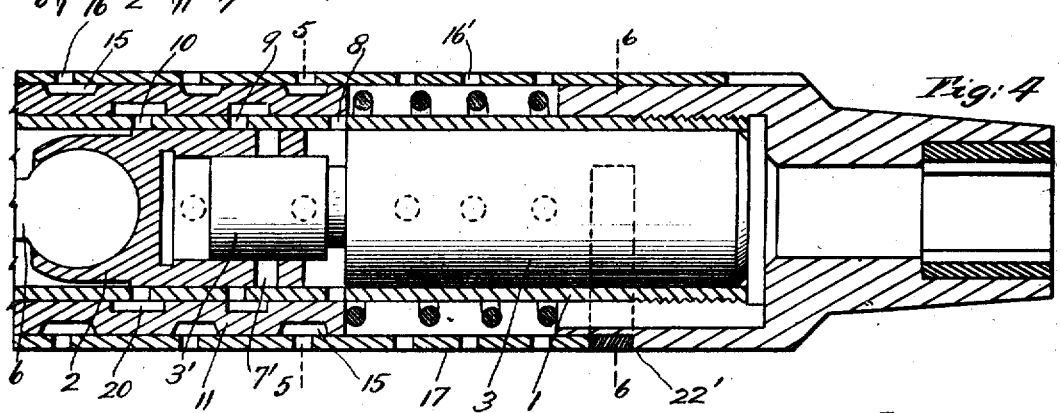
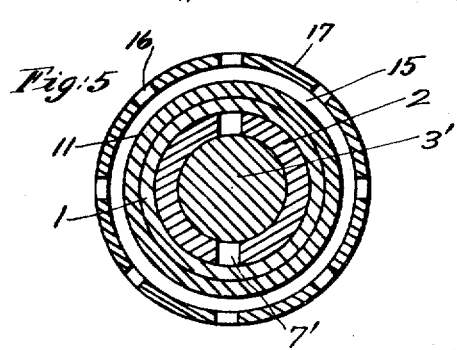
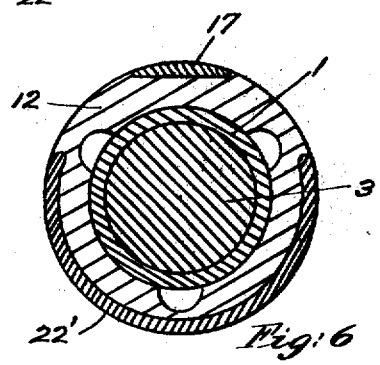
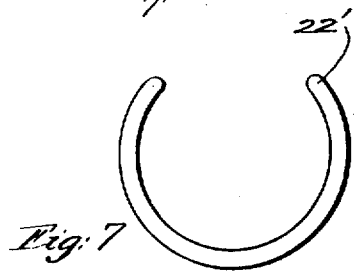
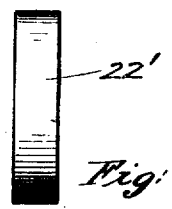
INVENTORS.
Bert Seaboldt
Herbert C. Brown.
BY William J. Jackson
ATTORNEY.

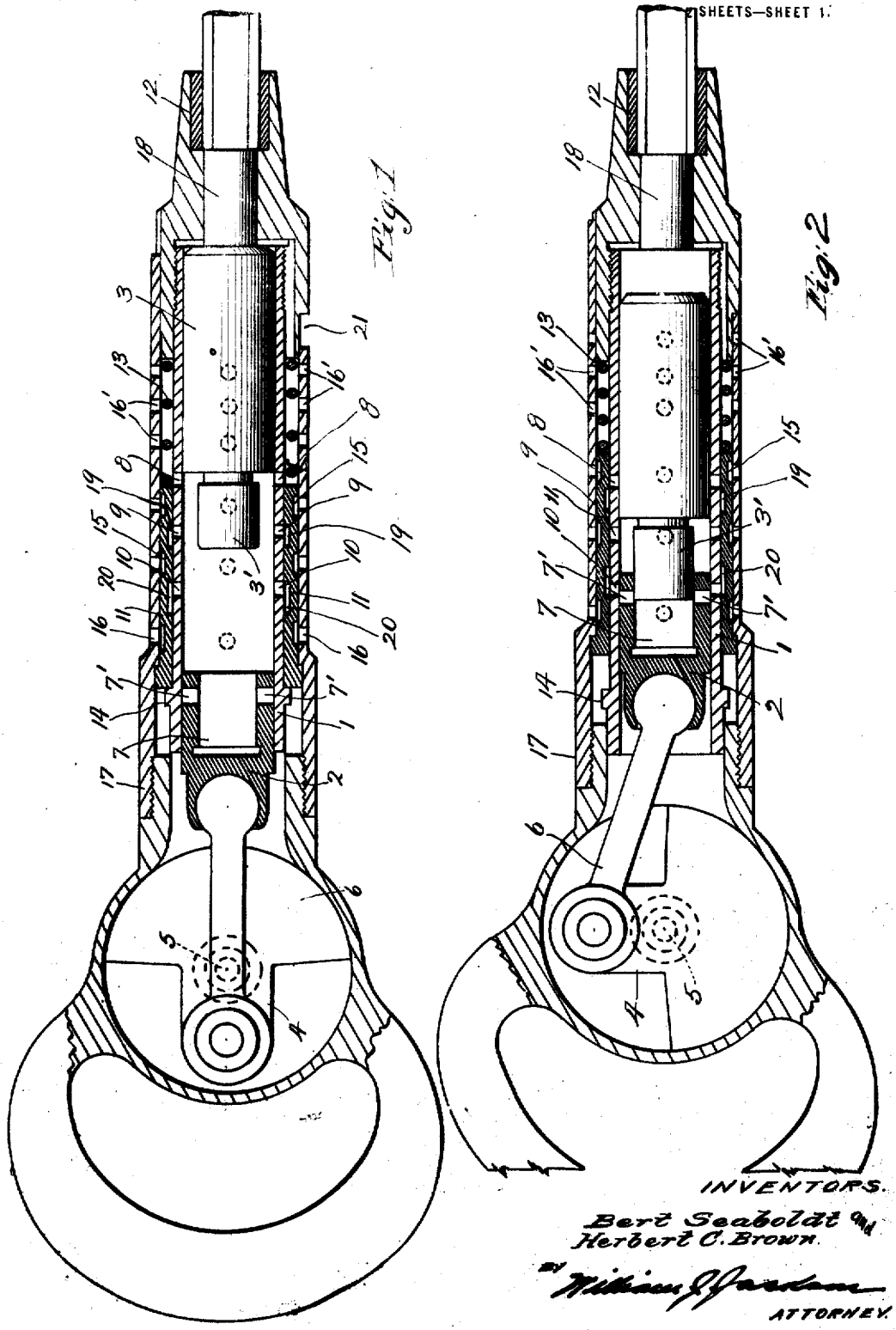

UNITED STATES PATENT OFFICE.

BERT SEABOLDT AND HERBERT C. BROWN, OF NEW YORK, N. Y., ASSIGNORS TO MICHAEL B. GARIBALDI, OF BROOKLYN, NEW YORK.

POWER-ACTUATED PNEUMATIC TOOL 1,402,727.

Specification of Letters Patent. Patented Jan. 3, 1922.

Application filed August 2, 1919. Serial No. 314,955.

*To all whom it may concern:*

Be it known that we, BERT SEABOLDT and HERBERT C. BROWN, citizens of the United States, residing at New York, county of New York, and State of New York, have jointly invented certain new and useful Power-Actuated Pneumatic Tools, of which the following is a specification.

The invention has relation to that class of device set forth in U. S. Patent No. 1,184,687. Practical experience in the handling of a tool of this character has demonstrated the necessity for certain improvements. An objectionable feature has been that upon the forward and return strokes of the piston the impingements of these parts were of such force that a decided metallic sound was produced. One object of the present invention is to overcome this defect by providing a power-actuated pneumatic tool in which, during its normal working periods the floating plunger and piston are connected by a pneumatic cushion. Another disadvantage of said patented tool was that the same became unduly heated. Another object of the present invention is the provision of means whereby continuous circulation of atmospheric air may be maintained around the control-sleeve. A still further disadvantage of said patented tool was the lack of positive means for determining a proper graduation of the force of piston blows. It is a still further object of the present invention to provide interchangeable devices for positively controlling the force of blow struck. Another commercial disadvantage for said patented tool was the absence of a practical nozzle support which defect has been remedied in the present construction.

The invention consists of the improvements hereinafter described and finally claimed.

The nature, characteristic features and scope of the invention will be more fully understood from the following description taken in connection with the accompanying drawings forming part hereof, and in which:

Fig. 1, is a longitudinal sectional view of a tool embodying the principles of our invention, the same being illustrated in a position of rest.

Fig. 2, is a similar view illustrating the piston upon a partial completion of its forward stroke.

Fig. 3, is a fragmentary view in longitudinal section illustrating the piston upon the completion of its forward stroke and further illustrating means for limiting the force of the plunger blow.

Fig. 4, is a similar view illustrating the manner of further limiting the force of the plunger blow.

Fig. 5, is a view in transverse section taken upon the line 5—5 of Fig. 4.

Fig. 6, is a similar view taken upon the line 6—6 of Fig. 4, and

Figs. 7 and 8 are respectively a face view and a side elevational view of the spacer shown in Fig. 4.

For the purpose of illustrating our invention we have shown in the accompanying drawings one form thereof which is at present preferred by us, since the same has been found in practice to give satisfactory and reliable results.

In the drawing 1 designates a cylinder in which operates a piston 2 and a floating plunger 3. The piston may be reciprocated in cylinder 1 by any suitable power actuated device. As an exemplification of an operative embodiment of means to this end we have shown in the drawings an eccentric 4 mounted upon a driven shaft 5 connecting which eccentric and the piston is a pitman 6. The shaft $5_b$ may be driven by any convenient arrangement of power mechanism. In practice the shaft is driven through the instrumentality of an electric motor and flexible shafting. The piston 2 is provided at its outer end with a longitudinally disposed chamber 7 of a depth equal to the throw of eccentric 4, ports 7' for the ingress of air being provided in said chamber. The floating plunger 3 is provided at its inner end with an extension 3' shaped and proportioned for a sliding fit within the piston chamber during the tool operation. The walls of cylinder 1 are provided with ports designated 8, 9 and 10. Surrounding cylinder 1, and fixed to barrel 17 as by a "drive fit" and adapted for longitudinal sliding movement therealong, is a port control sleeve 11. Interposed between the outer end of sleeve 11 and the inner end of the nozzle or tool holder 12, which is fixed to cylinder 1, is a coiled spring 13 which normally tends to maintain tool-holder 12 and cylinder 1 in the position shown in Fig. 1. The outer wall of sleeve 11 is provided with a plurality of spaced annular grooves 15 which are distributed substantially throughout the length of said sleeve. These grooves are in constant communication with atmospheric air by reason of air intake ports 16 provided barrel 17. Other ports 16' are provided in barrel 17 at its outer end. The ports 16 and 16' serve to permit of a continuous circulation of atmospheric air around both control sleeve 11 and cylinder 1 for cooling purposes. The ports 16' have a further function in that when the sleeve 11 is in the position shown in Fig. 1 the interior of cylinder 1 is freely open to atmospheric air through ports 8 and 16'. Under these conditions reciprocation of the piston 2 does not create substantial compression and suction so that the floating plunger remains idle. With the shifting forward of barrel 17 and sleeve 11, however, port 8 is closed by sleeve 11 so that compression and suction operations take place in the cylinder by reciprocation of the piston therein with consequent operation of the floating plunger for effecting a hammer blow upon the shank 18 of a tool held in nozzle 12. In other words in the neutral position of sleeve 11 atmospheric pressure is practically the same at each end of the floating plunger but in the operating position of sleeve 11 reduction of air pressure at the inner end of floating plunger is effected thereby causing the plunger to reciprocate in harmony therewith. As soon as the operator exerts pressure upon the handle end of the barrel, sleeve 11 is moved outward against tension of spring 13 so that port 8 is closed thus reducing the area for the escape of air which is by way of channels 19 and 20 of sleeve 11. The blow imparted to the tool shank is slight at this time. As the sleeve is pushed farther forward the blows are increased in force gradually as ports 9 and 10 are successively closed. During this starting operation the plunger extension has entered the piston chamber and during subsequent hammer blow is carried with the piston both on its inward and outward strokes. Upon the inward strokes of the piston a partial vacuum is maintained in the piston chamber thereby preventing disengagement of the piston and plunger. In this connection the ports 7' serve to permit recharging of air to chamber 7 as clearly illustrated in Fig. 2. Such air cushion has two functions. It contributes to the force of the blow without metallic impact between the piston and plunger and prevents the plunger extension from impacting against the piston upon its return stroke. In Fig. 2 the tool parts are shown positioned for delivering a maximum blow, portholes 8 and 9 being absolutely closed. It is sometimes desirable to have the tool deliver lighter blows. Figs. 3 and 4 illustrate the tool parts positioned for delivering regulated blows of predetermined
force. Spacers of different widths are em-
ployed for this purpose, Figs. 7 and 8 illustrating the details of construction of one of such spacers which are substantially U-shaped. The underside of that portion of nozzle 12 over which barrel 17 has sliding engagement is notched as at 21 to limit the forward movement of the barrel when tool is delivering its hardest blow. To positively regulate the tool to strike a lighter blow, spacer 22, see Fig. 3, is fitted to the notched part 23 of nozzle 12. Such spacer in position so retards the forward movement of barrel 17 and control sleeve 11 that ports 8 and 9 of cylinder 1 are closed but ports 10 are open thereby slightly decreasing the partial vacuum in cylinder 1 in consequence of which the tool delivers a lighter blow. To positively regulate the tool to deliver a still lighter blow spacer 22' is substituted for spacer 22. With spacer 22' in position barrel 17 and control-sleeve 11 are so retarded in their forward movement that ports 8 are closed and ports 9 and 10 are open thereby still further decreasing the partial vacuum in cylinder 1 in consequence of which the tool delivers a still lighter blow.

What we claim is:—

1. In a tool of the character stated the combination of a cylinder, capable of being shifted endwise, a nozzle to receive the shank of a tool connected to one end thereof, an eccentric, a piston within the cylinder connected to said eccentric said piston being provided at its outer end with an air chamber of a depth equal to the throw of said eccentric and floating plunger adapted to deliver hammer blows upon the shank of a tool as held in said nozzle also within the cylinder which plunger is provided with an extension adapted to fit within said piston chamber and remain therein during piston strokes there being a vacuum present between the piston and plunger ends and between the end of the plunger extension and the innermost wall of said chamber when the piston is moving in one direction.

2. In a portable tool of the character stated a casing an eccentric mounted in said casing, an operator's handle secured to said casing, a cylinder, a piston within the cylinder connected with said eccentric said piston being provided with an air chamber at its outer end of a depth equal to the throw of said eccentric, and a floating plunger also within said cylinder said plunger being provided with an extension adapted to fit within said piston chamber and remain therein during piston strokes.

3. In a tool of the character stated, an eccentric, a cylinder, a piston within the cylinder connected with said eccentric said piston being provided with an air chamber at its outer end of a depth equal to the throw of said eccentric, said chamber being provided with ports for re-charging said chamber with air, and a floating plunger also within said cylinder said plunger being provided with an extension adapted to fit within said piston chamber and remain therein during piston strokes.

4. In a tool of the character stated a cylinder provided with ports a piston and plunger operative through said cylinder, a sleeve slidable over said cylinder for controlling said ports said sleeve being provided with a plurality of exterior grooves and a barrel surrounding said sleeve and movable therewith said barrel being provided with a plurality of air admission ports at least some of which are constantly in direct communication with said grooves.

5. In a tool of the character stated, a cylinder provided with ports, a piston and plunger operative through said cylinder, a nozzle fixed to said cylinder, a sleeve slidable over said cylinder for closing said ports in successive order, a barrel surrounding said sleeve and movable therewith which barrel is adapted to abut against said nozzle and interchangeable parts adapted for insertion between said nozzle and barrel for maintaining a selected port or ports permanently closed during tool operation.

6. In a tool of the character stated, an eccentric, a cylinder, a piston within the cylinder connected with said eccentric said piston being provided with an air chamber of a depth equal to the throw of said eccentric, said chamber being provided with means to permit air to enter said chamber and a floating plunger also within said cylinder, said plunger being provided with an extension adapted to set within said piston chamber and remain therein during piston strokes.

7. In a tool of the character stated a cylinder provided with ports, a piston and plunger operative through said cylinder, a sleeve slidable over said cylinder for controlling said ports said sleeve being provided with a plurality of air circulating passages and a barrel surrounding said sleeve and fixed thereto said barrel being provided with a plurality of air admission ports at least some of which are constantly in communication with said air circulating passages.

8. In a tool of the character stated, a cylinder provided with ports, a piston and plunger operative through said cylinder a nozzle fixed to said cylinder, a sleeve slidable over said cylinder for closing said ports in successive order, a barrel surrounding said sleeve and fixed thereto which barrel is adapted to abut against said nozzle and means adapted for insertion between said nozzle and barrel for maintaining a selected port or ports permanently open during tool operation.

9. In a tool of the character stated a cylinder provided with ports, an eccentric, a piston within the cylinder connected with said eccentric, said piston being provided with an air chamber at its outer end of a depth equal to the throw of said eccentric, a floating plunger also within said cylinder said plunger being provided with an extension adapted to fit within said piston chamber and remain therein during piston strokes, a sleeve slidable over said cylinder for controlling the ports of said cylinder said sleeve being provided with a plurality of exterior grooves and a barrel surrounding said sleeve and fixed thereto, said barrel being provided with a plurality of air admission ports at least some of which are constantly in communication with said grooves.

10. In a tool of the character stated, a cylinder provided with ports, an eccentric, a piston within the cylinder connected with said eccentric said piston being provided with an air chamber at its outer end of a depth equal to the throw of said eccentric, a floating plunger also within said cylinder, said plunger being provided with an extension adapted to fit within said piston chamber and remain therein during piston strokes, a nozzle fixed to said cylinder, a sleeve slidable over said cylinder for closing said ports in successive order, a barrel surrounding said sleeve and fixed thereto which barrel is adapted to abut against said nozzle and interchangeable parts adapted for insertion between said nozzle and barrel for maintaining a selected port or ports permanently open during tool operation.

In testimony whereof, we have hereunto signed our names.

BERT SEABOLDT.
HERBERT C. BROWN.